Jan. 28, 1947.  H. E. KALTER  2,414,954
RESILIENT MOUNTING FOR CYCLE SADDLES
Filed Sept. 23, 1941  2 Sheets-Sheet 1

INVENTOR.
Harold E. Kalter
BY Frank M. Slough
HIS ATTORNEY

Jan. 28, 1947.　　　H. E. KALTER　　　2,414,954
RESILIENT MOUNTING FOR CYCLE SADDLES
Filed Sept. 23, 1941　　　2 Sheets-Sheet 2

INVENTOR.
Harold E. Kalter
BY Frank M. Slough
HIS ATTORNEY

Patented Jan. 28, 1947

2,414,954

UNITED STATES PATENT OFFICE 2,414,954

RESILIENT MOUNTING FOR CYCLE SADDLES

Harold E. Kalter, Elyria, Ohio, assignor to The Troxel Manufacturing Company, Elyria, Ohio, a corporation of Ohio Application September 23, 1941, Serial No. 411,981

2 Claims. (Cl. 155—5.20)

1

My invention relates to cycle saddles and relates particularly to resilient mountings for cycle saddle seats.

In saddles of the prior art with which I am familiar, a pair of compression springs or the like are commonly disposed at and below the rear of the saddle seat whereby said seat is resiliently mounted on the cycle.

Various types and combinations of metallic wire and leaf springs have been employed to resiliently mount the seat on the cycle, and in connection therewith, reach elements have been supported on the cycle, variously secured to the cycle frame for supporting the springs which in turn carry the cycle seat. Such resilient means have been in the form of tension and compression springs, variously arranged.

An object of my present invention is to provide an improved mechanism for resiliently supporting a cycle seat on a cycle frame in which metallic spring means are dispensed with, and resilient means, such as rubber, are substituted therefor.

It is an object of my invention to provide an improved resilient cushioning mounting for cycle saddles as will cushion the saddle against shocks and permit resilient yielding of the saddle responsive to riding of the cycle and to stresses imposed by a rough terrain or the like.

Another object of my invention is to provide resilient means of the type referred to which will absorb shocks and which will be durable and highly efficient in use.

Another object of my invention is to provide resilient means of the type referred to which will require a small number of parts and will be inexpensive to manufacture.

Another object of my invention is to achieve the foregoing objects by a resilient saddle supporting mechanism wherein resilient resistance to torsion of one or more bodies of rubber resiliently cushions the cycle saddle in an economical highly efficient manner.

Other objects of my invention and the invention itself will become more apparent by reference to certain embodiments of my invention and by reference to the accompanying drawings of said embodiments, in which drawings.

2

Figures 3, 4, 5, 6:
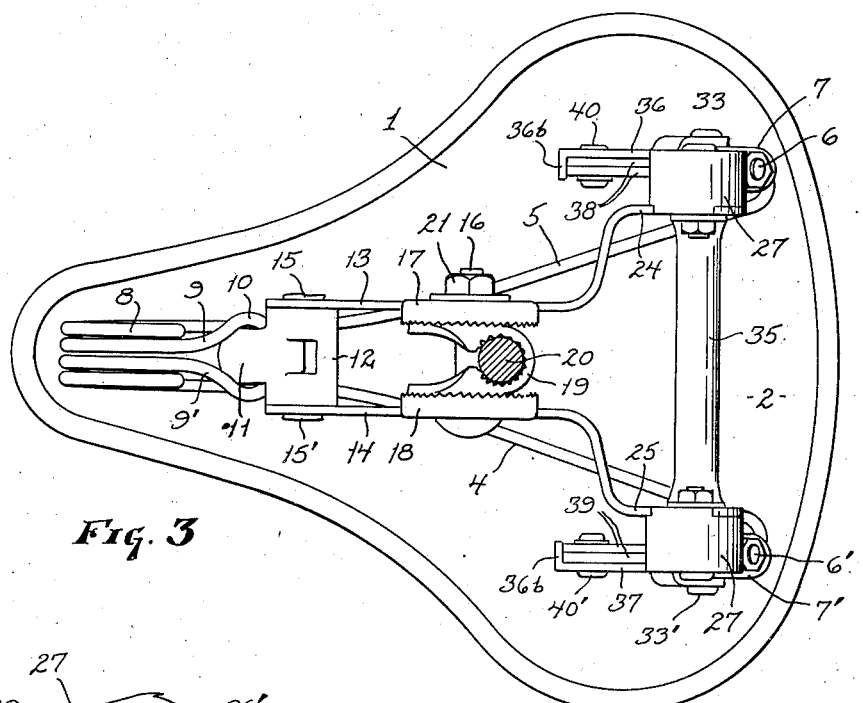
Fig. 3 is a bottom plan view of the saddle mechanism of Fig. 1.

Fig. 4 is a perspective view of the improved resilient mounting of said embodiment, a portion being broken away to better disclose the structure;

Fig. 5 is a fragmentary view largely diagrammatic showing the relative positioning of parts of the saddle assembly of said embodiment, under loaded and unloaded conditions; and Fig. 6 is a rear elevational view showing parts of the saddle assembly, in the full line position of Fig. 5.

My invention is susceptible to incorporation in cycle saddle assemblies of widely varying types, that illustrated in the drawings being merely typical of one of such types.

My invention in its broader aspects resides in the incorporation in a cycle saddle assembly of a body of rubber or equivalent resilient material so associated between relatively rotatable elements of linkage disposed between the cycle seat and the cycle, that the up and down movements of the rear, forward, or both rear and forward ends of the saddle are resiliently resisted by the resistance of a body of rubber to torsional stresses upon the rubber body at separated points thereof.

Preferably this is accomplished by the provision of a pair of lever arms, each of the pair being united or joined to the rubber body at relatively spaced portions thereof, the unit comprising said lever arms and rubber body being incorporated into means for supporting the cycle seat on a cycle saddle post in such manner that the lever arms are subjected to relative rotational movement on an axis passing through the rubber body, whenever weight such as the weight of a rider is imposed upon said seat, or when the cycle moves over rough terrain.

Preferably, as in the embodiment of my invention herein illustrated, two of such rubber bodies with associated relatively rotatable links are provided, these adapted to act in tandem and being disposed generally below the cantle seat portion and more particularly resisting downward movement of said cantle portion. However, my invention is not limited to the provision of precisely two such resilient weight resisting rubber bodies, as above set forth, but, as will be apparent to those skilled in the art, may be variously embodied in cycle structures with either a single rubber body, or any reasonable number thereof, so disposed in the linkage between the cycle saddle post and the saddle seat as to resist downward movement of each or various parts of the saddle in response to the effect of weight and other riding stresses imposed by the seat on the seat supporting means.

From the foregoing it will be readily understood that in the embodiment illustrated, the structure of cycle saddle seat may be widely varied, as also may be the connections between the cycle saddle post and the saddle. Therefore, as illustrated, the cycle seat 1 may be of any desired type and construction, such as that of the embodiment illustrated, which comprises a leather or like cover $a$, a form-sustaining sheet metal frame 2 with cushioning padding $b$ being interposed and confined between the cover $a$ and the frame 2.

Figure 1:
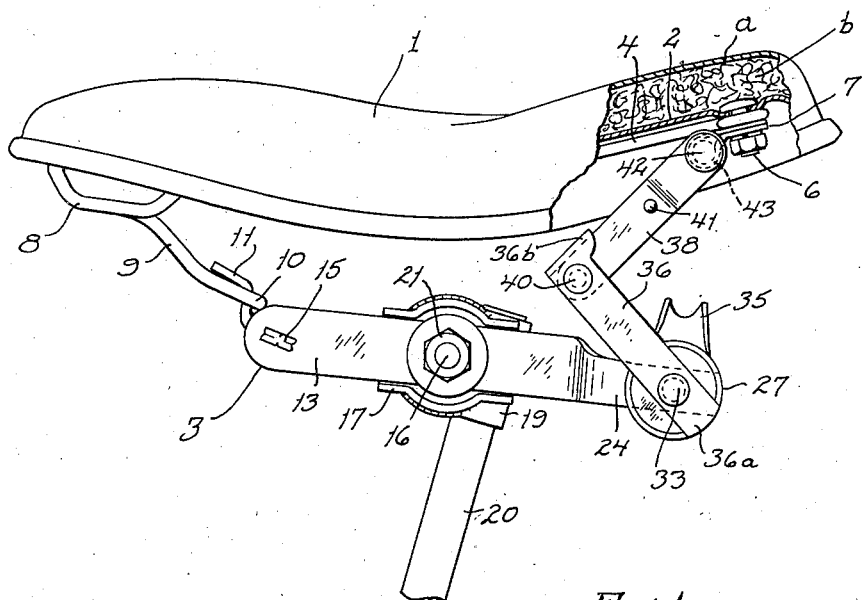
Fig. 1 is a side elevational view partially in section of a cycle saddle employing an improved resilient mounting embodying the principles of my invention.
Figure 2:
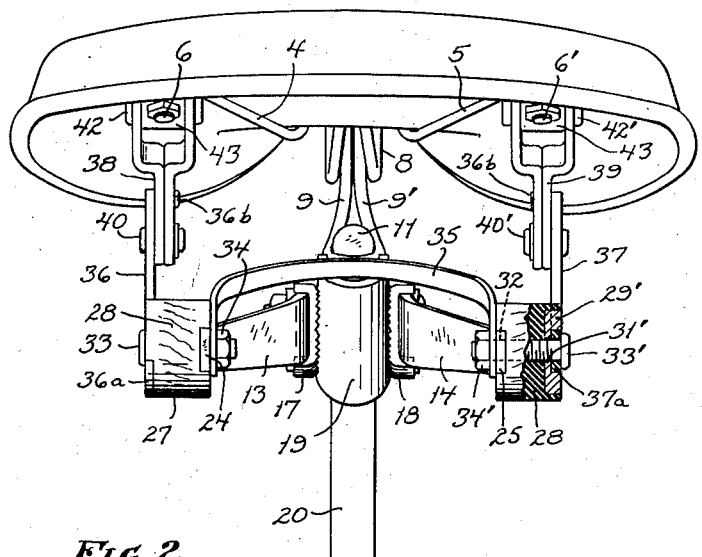
Fig. 2 is a rear elevational view of the saddle and mounting therefor of Fig. 1.

The cantle or nose coil 8 may be of the type herein shown and may or may not have rearward extensions 4 and 5 which are secured by bolts 6 and 6' to the frame at laterally spaced points as indicated in Figs. 1-3 inclusive. The lowermost extremities of the nose coil 8 may desirably be formed with rearward extensions 9 and 9' which are so formed and preferably joined at 10 to form an eye 10 adapted to receive an interlocking projection 11 of the stamping 12 which extends forward from the two laterally spaced reach elements 13 and 14, which in turn, are rigidly secured together as at 15 and 15' by the interposed rearmost portion of the stamping 12.

In the embodiment shown, I have illustrated the laterally spaced reach members 13 and 14 in curved form so as to dispose the rearmost portions 24 and 25 in relatively widely spaced relation in the region where the rearmost ends of such reach members are, in the usual construction, secured to the usual coil wire springs which are commonly interposed between such reach member ends and laterally spaced portions of the cycle seat frame as at 6 and 6'.

In accordance with the common practice, I employ some kind of clamping means for rigidly clamping the reach members at an intermediate portion of their length to a cycle saddle post 20, the means illustrated in the embodiment of my invention shown and here described comprising the customary inwardly serrated suitably formed discs 17 and 18 with an outwardly serrated generally U-shaped strap 19 interposed between the discs 17—18 and the post 20, a bolt 16 and nut 21 being used to secure said clamp and reach members together, said bolt 16 being projected through said discs 17 and 18 and through said reach members 13 and 14.

By the clamping means herein shown, as is well known, the reach members 13 and 14 may be adjustably rigidly positioned in the correct angular relation to and at the top of the cycle post 20.

In substitution for the usual coil springs for interconnecting the rear ends of the reach members and the rear portion of the seat frame 2 at preferably laterally spaced points, as indicated by the region of the bolts 6 and 6', I employ some such means as the pairs of "jack-knifing" blades or relatively rotatable levers 36 and 38, also 37 and 39, the paired links being pivotally secured together by a rivet or like pin 40 and 40' respectively, with a portion of one of each pair of said levers preferably so formed, as by the provision of the flange 36b, as to prevent the two levers 36 and 38 from relatively diverging at more than a predetermined angle, which, in the embodiment shown, is a 90° angle, this being the maximum angle of divergence between each lever and its paired lever, and achieved when the saddle seat is in idle unweighted condition.

However, the manner of pivotally joining any of such pair of levers permits such paired levers to be relatively rotated about the axis pin 40 so as to vary the angle defined by the levers responsive to the weight of a rider when seated on the cycle seat.

The free ends of each pair of jack-knifing levers, described, are also pivotally connected to an element secured to the underside of the cycle seat, such as the loop strap 7 or 7' and the extreme end portion 25 of the reach strap 14, or the extreme end 24 of the reach strap 13, respectively.

The pivotal connections for the uppermost free ends of the levers 38 and 39 are provided by coupling pins or rivets 42 and 42' projected respectively through the spaced upper end portions of the lever and through the intermediate eye 43 of the loop strap 7.

Bolts, such as 6 and 6' with associated nuts, rigidly secure the ends of the straps 7 and 7' to the metal base 2 of the cycle seat. By virtue of this arrangement, the lever blades 38 and 39 are pivotally joined at their upper ends to the underside of the cycle seat in relatively laterally spaced relation to each other, and at their lower ends to the upper ends of the lower blades 36 and 37; the levers 38 and 39 being preferably made of two separate stampings, each with relatively spaced and transversely perforated upper ends in order to cause these elements to have substantially U-shaped upper ends in order to embrace the outer ends of the eye 43 of the loop strap 7 or 7'.

The pivoting of the lowermost ends of the lowermost lever blades 36 and 37 to the rearmost ends of the reach straps is caused to be of such a nature, by the interpositioning of the rubber bodies 27 and 28 in the connections, as to hold these blades resiliently constrained toward a fixed normal angular position as shown in Fig. 1.

The resilient cushioning unit comprising the rubber bodies 27 and 28 is perhaps best illustrated in Figs. 2 and 4, wherein these units are shown having each rubber body in the form of a centrally, perforated rubber disc, the peripheral portions of which are of the greatest width, the ends being recessed to accommodate centrally perforated metallic discs 29 and 29', each of which are provided with diametrical grooves 26 and 26' across their outer faces, said grooves being of a width substantially greater than the diameters of their central perforations, one of which is shown at 31.

The perforations through the rubber and metallic end pieces are, of course, in axial alignment with the bore through the rubber body, preferably somewhat larger in diameter than that through the metallic discs. The metallic discs are fitted closely within the end recesses of the rubber body, and by any well known rubber and steel bonding process, the contacting surfaces of the rubber and of the metal are bonded so as to form a so-called integral connection throughout the contacting surfaces.

The widths of the slots 26 and 26' are made of such dimensions as to readily, but snugly, receive the ends of the lowermost levers 36 and 37 at the one side of the unit and of the rearmost blades 13 or 14 at the other side of the unit.

Bolts, such as 33 and 33' for the two resiliently torsional units, securely clamp the lower perforated ends of the levers 36 and 37, the said flexible units, the rearmost ends of the reach straps and also the ends of a spacing strap 35 together in cooperation with the nuts 34 on the threaded ends of the bolts.

A reference to Fig. 4 reveals that the groove 26' for the metallic disc 29' extends at a substantial angle to that for the metallic disc 29, and at a somewhat greater angle than is indicated in Fig. 1, which illustrates the cycle saddle assembly in normal unweighted condition, and that the angle of divergence of the slots 26 and 26' in Fig. 4 and in Fig. 1 is, in each case, substantially greater than that as indicated in Fig. 6 and by the dotted line showing of Fig. 5. This angularity, as illustrated in Fig. 1, is repeated in Fig. 2 which also shows the non-used or normal condition of the cycle saddle assembly.

This variation in angularity between the slots of the two metallic ends of the unit, as shown in Fig. 4 through different conditions, will be readily understood from the explanation that, whereas Fig. 4 shows the rubber body free from any torsional stress adapted to be imposed by the relative partial rotation of the two metallic end discs, even with the cycle seat unloaded by weight imposed upon it, as illustrated in Figs. 1 and 2, the rubber bodies 27 and 28 are then subjected to a predetermined amount of torsonal stress imposed by a substantial amount of relative rotation of the two metallic end pieces or discs caused by a substantial partial rotation of the lowermost lever 36, this lever having been placed in the slot of one metallic end piece relative to the associated reach strap, whose end had also been placed in the slot of the other end metallic disc at the opposite end of the rubber body. It is this relative rotation, which imposes an initial torsional stress on the intermediate rubber body, which is maintained by the fact of the engagement between the flange 36b of the lever 36 against the forward upper lateral surface of the lever 38, thereby preventing further divergence in angularity as between the levers 36 and 38, as shown in Fig. 1.

This restraint as between the flange 36b, the pivot pin 40 and the lever 38, prevents the levers 36 and 38 from diverging further than is illuustrated in Fig. 1, such as would be necessary in order to permit the lever 36 to increase its angular direction of extent relative to the reach strap 24, other than as illustrated in Fig. 1. By this arrangement, the rubber body is partially, normally and continuously torsionally stressed, and this torsional stress resiliently constrains the jack-knifing lever blades 36 and 38 in their maximum divergent positions, as shown in Fig. 1, and as shown by the dotted line of Fig. 5, in such manner as to resiliently support a predetermined amount of weight on the cycle seat before the rubber bodies, by further distortion due to such weight, positionally resiliently yield to effect lesser angularity as between the lever blades 36 and 38, and, in turn, to reduce the angularity between the slots 26 and 26', as when the weight of a rider is imposed on the cycle seat which brings about a situation wherein the two jack-knifing lever blades 36 and 38 are relatively angularly disposed at a considerably reduced angle, and the slots in the metallic ends for the unit of Fig. 4 are brought more closely into parallel alignment as shown in Fig. 6 and as clearly indicated by Fig. 5.

It will be understood that, in the foregoing, where I have referred merely to the unit and the associated parts for one side of the cycle saddle, that the same action is reproduced at the other side of the cycle saddle by the other unit, which is reversely positioned and is preferably identically complementary in structure connection and mode of operation.

Preferably, also in accordance with usual practice, I provide the bracing strap 35 between the rearmost ends of the two reach members 13 and 14, being secured by similar bolts, such as 33 or 33', which pass through the aligned apertures of the parts of the unit of Fig. 4, being also passed through apertures provided in the reach strap ends; nuts 34, 34' being provided to maintain the bolt in position to clamp the associated end of the strap 35, the lowermost levers 36 and 37, and the unit of Fig. 4 together with the apertures thereof in axial alignment.

Preferably, the linkage comprising the lever, such as 36 and 38, is best assembled to the unit of Fig. 4 and with the unit of Fig. 4 secured to the pair of units as in Fig. 4, and these units secured together with the associated lever blade bolts on the reach straps, prior to the securing of the free upper end of the lever blades 38 and 39 to the eye of the strap 7 which is carried on the underside of the cycle seat.

In this manner of assembly, it will be found in order to bolt the upper ends of the levers 38 and 39 to the underside of the cycle seat that some effort must be exerted in order to relatively rotate the two ends of the cushioning unit as in Fig. 4 to the thenceforth normally torsioned position, as indicated by Figs. 1 and 2.

Thenceforth, the rubber bodies 27 and 28 are always in position so that the cycle seat will resist downward movement until a predetermined amount of weight is placed on the cycle seat and to prevent too much downward movement of the cycle seat when substantial weights are carried by it.

As previously state, the drawings illustrate and the preceding description describes but a single embodiment of my invention. Numerous variations might readily be maoe therefrom within the purview of my invention, as for instance, units substantially like Fig. 4 might be provided at the pivotally joined upper ends of the link levers 38—39, or at the joint between each of the paired levers, such as 36—38, and also may be placed in a similar linkage at the forward end of the saddle.

Also, in the following claims, the structure comprising the straps 13 and 14, clamping elements 16 to 21 inclusive, stamping 12 and connecting strap 35 with associated connecting means, may for convenience be termed the reach means, or fixed base, and the elements comprising the spring 8, and elements 7, 27, 28, 36, 37, 38, 39 may similarly be termed flexible seat supporting linkage, all for the purpose of functionally grouping the fixed and movable parts of structure.

Also, the form of the jack-knifing linkage might be considerably varied, the joined ends of the levers 36—38 might extend rearwardly, and various other arrangements made involving readily perceptible equivalent reversible parts and aggregational assemblies, all within the scope of the present invention.

I claim:

1. In a cycle saddle, the combination with a cycle seat and seat supporting reach means, of flexible linkage carried by the reach means, said linkage comprising at least one pair of mutually pivoted links, the links in said pair being pivotally connected respectively to the underside of the seat and to the rear portion of the reach means and extending relatively convergingly forward to their mutually pivoted ends and being thus positioned between said reach means and said seat, and a body of rubber or like resilient material interposed at the reach pivotal connection with oppositely disposed relatively spaced portions of said body rigidly affixed respectively to the reach means and the associated link at longitudinally different points with respect to their common axis, the initial assembly of such parts placing the body under predetermined initial torsional stress, whereby rotational movement of said associated link about the axis of its pivotal connection with the reach means is torsionally resiliently resisted by the body, the weight of a rider on said cycle seat displacing said seat and jack-knifing said links thereby increasing the initial torsional stress imposed upon said body and resiliently distorting the body to varying degree according to the weight imposed upon the seat, stop means associated with one of said pivoted link members limiting said link from exceeding predetermined angularity of position with respect to the other said link whereby the body is maintained at all times in torsionally stressed condition.

2. In a cycle saddle, the combination with a cycle seat and seat supporting reach means of a pair of levers, the uppermost said lever being pivotally secured to the underside of the seat and the lowermost said lever being secured to said reach means, the said levers being pivotally connected together, a resilient cushioning unit comprising a centrally perforated resilient body, the outer faces thereof being recessed, a pair of centrally perforated metallic elements, each of said elements being positioned within one of said recessed face portions and provided with a diametrical groove disposed therein, said grooves being disposed at different angles to said resilient body interposed therebetween and to each other, each groove being of a width slightly greater than the width of the associated end of the reach member or the free end of the lowermost lever to accommodate the seating thereof within said grooves, means adapted to rigidly secure the ends of the lowermost lever and the reach member and the interposed resilient cushioning unit together, stop means carried by one of said levers and adapted to limit upward movement of the other said lever with respect thereto, and upon weight being placed upon the seat the said levers are depressed and said lowermost lever acts as a crank to increase the torsional resistance offered by the resilient body opposing such downward movement.

HAROLD E. KALTER.